United States Patent [19]

Kondo et al.

[11] 4,385,818
[45] May 31, 1983

[54] MULTIPLE ELECTRONIC FLASH CONTROLLING APPARATUS

[75] Inventors: Isao Kondo, Hachioji; Osamu Kawarada, Fuchu, both of Japan

[73] Assignee: Olympus Optical Company Ltd., Tokyo, Japan

[21] Appl. No.: 399,479

[22] Filed: Jul. 19, 1982

Related U.S. Application Data

[63] Continuation of Ser. No. 216,611, Dec. 15, 1980, abandoned.

[30] Foreign Application Priority Data

Feb. 13, 1980 [JP] Japan .................. 55-16386

[51] Int. Cl.³ .............................. G03B 15/05
[52] U.S. Cl. ............................ 354/33; 354/132
[58] Field of Search ............ 354/32, 33, 34, 35, 354/60 F, 132, 145

[56] References Cited

U.S. PATENT DOCUMENTS

4,174,896 11/1979 Mizokami et al. .............. 354/132

FOREIGN PATENT DOCUMENTS

55-7772 1/1980 Japan .
55-9553 1/1980 Japan .
55-9554 1/1980 Japan .

*Primary Examiner*—Michael L. Gellner
*Attorney, Agent, or Firm*—Weinstein & Sutton

[57] ABSTRACT

An electronic flash assembly including a plurality of flash units for illuminating an object, one of which determines reflected light from the object being photographed and also produces a flashlight interrupting, control signal when a proper amount of illumination has been given. The control signal is supplied to all the flash units through an external control terminal, to interrupt the emission of flashlight from the plurality of flash units.

3 Claims, 2 Drawing Figures

MULTIPLE ELECTRONIC FLASH CONTROLLING APPARATUS

This is a continuation of application Ser. No. 216,611, filed Dec. 15, 1980, abandoned.

BACKGROUND OF THE INVENTION

The invention relates to a multiple bulb controlling electronic flash assembly, and more particularly, to such an assembly in which a plurality of electronic flash units are combined with a photographic camera to permit a flash photography under the illumination from the electronic flash units.

A number of advantages accrue from a flash photography conducted under a simultaneous illumination from a plurality of electronic flash units connected with a photographic camera. Thus, the plurality of electronic flash units may be disposed at discrete locations to permit an object being photographed to be illuminated from several directions, thus avoiding a non-uniformity in the illumination. Also, the use of a plurality of electronic flash units increases the illuminance upon the object.

A problem experienced with the use of a plurality of electronic flash units to permit a flash photography is to assure a proper exposure. An electronic flash unit of the type which is commonly referred to as "auto-strobo" is designed to determine reflected light from an object being photographed which is under a flash illumination from the electronic flash unit, and to cease the illumination from the electronic flash unit whenever a proper amount of illumination has been given to the object. However, where a plurality of electronic flash units are simultaneously used to provide a multiple flashbulb illumination, no means is available as yet which concurrently ceases the illumination from the individual electronic flash units upon reaching a proper exposure, thus allowing the respective units to work fully before they cease to operate. When a plurality of electronic flash units are used in combination with a single lens reflex camera of TTL photometry type, a photometric circuit within the camera determines reflected light from an object being photographed and produces an illumination control signal when the illumination produced by the units has reached a proper value, which signal is fed to the respective units to interrupt the light emitting operation thereof. However, cameras other than the single lens reflex camera mentioned above as well as those single lens reflex cameras which are not provided with a capability or a terminal to deliver the illumination control signal externally cannot control the plurality of electronic flash units for a simultaneous operation.

SUMMARY OF THE INVENTION

It is an object of the invention to eliminate the described disadvantage of the prior art, by providing a multiple flashbulb controlling electronic flash assembly having the capability to control a proper amount of illumination for use with a photographic camera which is not adapted to deliver an illumination control signal to the electronic flash units, thus permitting a flash photography under illumination from the multiple flashbulbs.

In accordance with the invention, one of the electronic flash units includes a photometric circuit which produces an illumination interrupting, control signal when a proper amount of illumination has been reached, which signal is fed to the remaining electronic flash units through an external control terminal, thus permitting a proper control of the illumination from the remainder of the flash units. Accordingly, the electronic flash assembly can be used with a photographic camera having no capability to deliver an illumination control signal, thus permitting a satisfactory flash photography under the illumination from multiple flashbulbs.

DESCRIPTION OF EMBODIMENT

Figure 1:
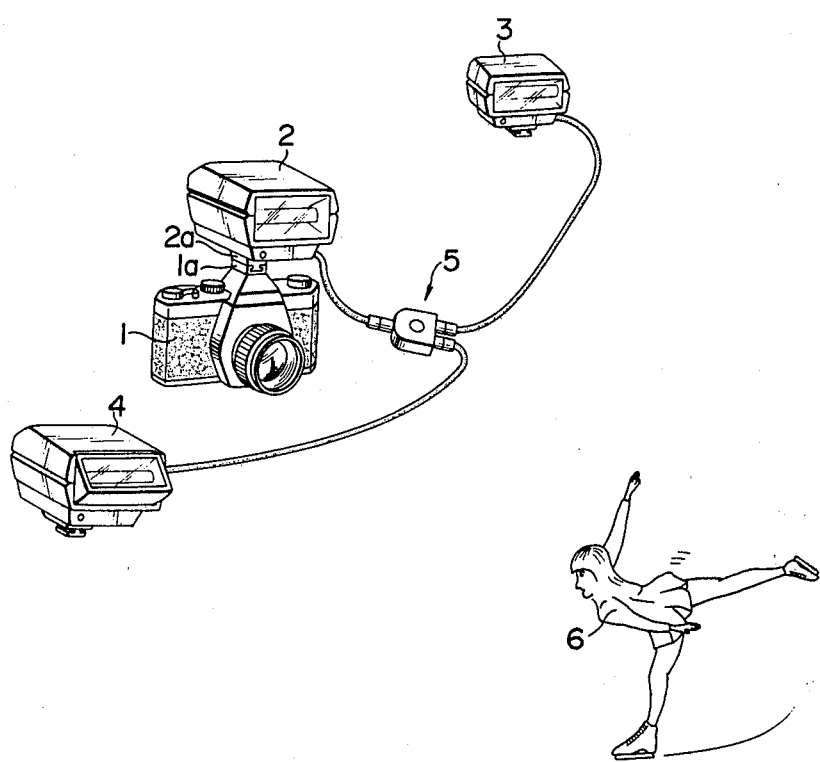
FIG. 1 is a pictorial perspective view of a multiple bulb controlling electronic flash assembly connected with a photographic camera.

Referring to FIG. 1, there is shown a photographic camera 1 carrying a hot shoe 1a on which a first or main electronic flash unit 2 is mounted through its mounting leg 2a. The main unit 2 is also connected with other electronic flash units 3, 4 (hereafter referred to as subsidiary units) through a multiple connector 5.

When the camera 1 and the main unit 2 as well as the subsidiary units 3, 4 thus combined are disposed in a proper orientation with respect to an object 6 being photographed and the shutter of the camera 1 is released, the main unit 2 as well as the subsidiary units 3, 4 are activated for illumination in synchronized relationship therewith. As the object 6 is irradiated by the resulting illumination, reflected light from the object 6 is determined by the main unit 2. When the main unit 2 determines that a proper amount of illumination has been given in response to the reflected light, it produces an illumination interrupting, control signal, which is effective to interrupt its own flashlight emitting operation and to feed the control signal to the subsidiary units 3, 4 simultaneously, thus interrupting the flashlight emitting operation of these units concurrently.

Figure 2:
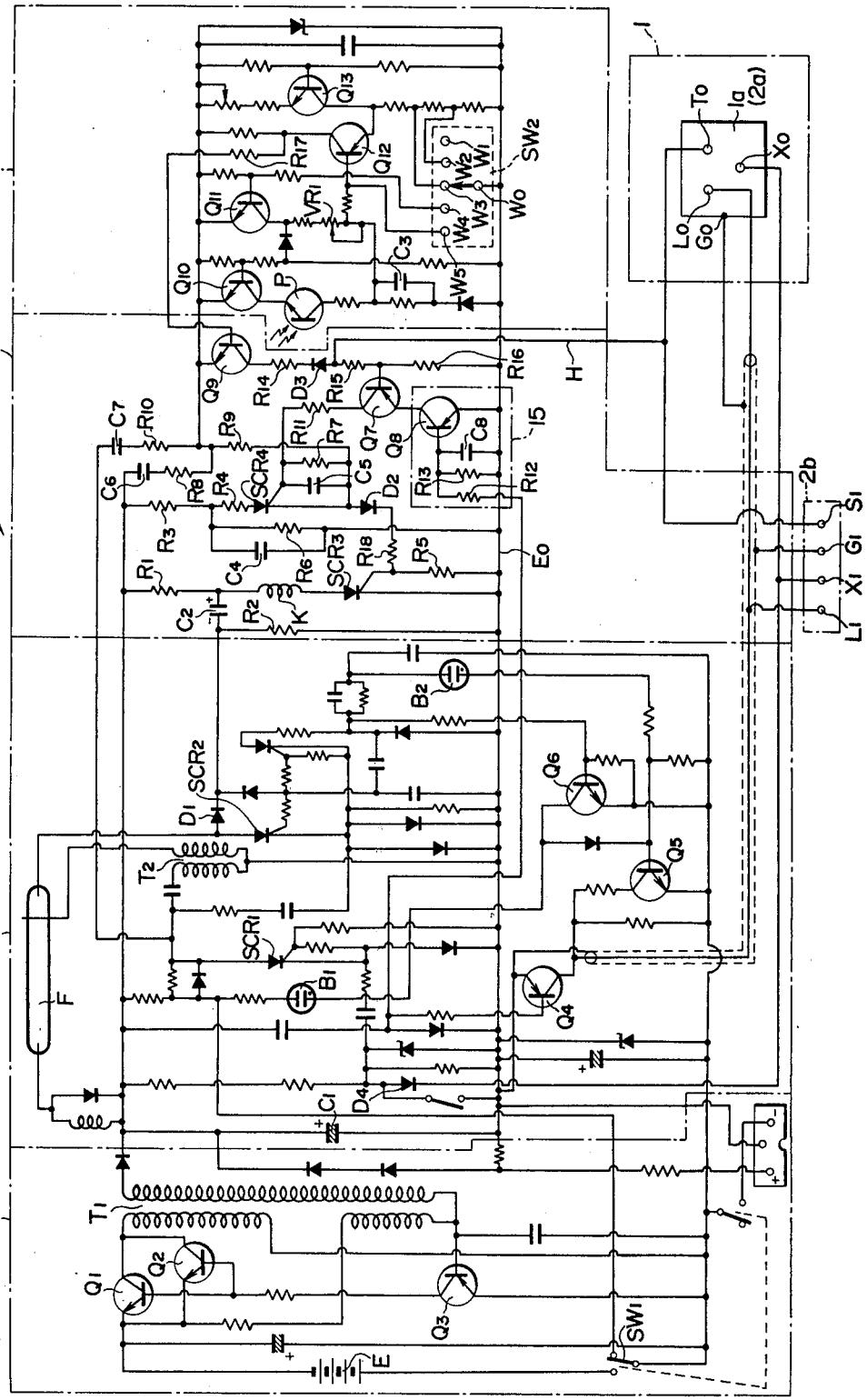
FIG. 2 is a circuit diagram of the electrical circuit of the assembly shown in FIG. 1.

FIG. 2 is a circuit diagram of one form of electrical circuit which may be used for the main unit 2 and the subsidiary units 3, 4. Specifically, the electrical circuit includes a power supply circuit 11 including a source battery E, a power switch SW1, and a DC—DC converter which is formed by oscillating transistors Q1–Q3, and an oscillating transformer T1. The electrical circuit also comprises a flashlight emission circuit 12 which includes a trigger circuit formed by a main capacitor C1, a trigger thyristor SCR1 and a trigger transformer T2; a flash discharge tube F, a series controlling thyristor SCR2, a display element B1 which indicates the completion of a charging operation, another display element B2 which indicates the completion of a flashlight operation, and transistors Q4–Q6. The electrical circuit further comprises a flashlight interruption circuit 13 which includes a commutating circuit formed by a commutating capacitor C2 and a thyristor SCR3, and transistors Q7–Q9; and an illumination control circuit 14 which includes a phototransistor P which is used for purpose of photometry, an integrating capacitor C3, a variable resistor VR1 which is used to establish a given level, and transistors Q10–Q13.

The flashlight interruption circuit 13 comprises a series circuit including a resistor R1, a reactor K and a thyristor SCR3 and which is connected across the main capacitor C1 of the flashlight emission circuit 12, or between the positive terminal of the main capacitor C1 and a ground bus E0. A series circuit including the commutating capacitor C2 and a resistor R2 is connected between the junction between the resistor R1 and the reactor K and the ground bus E0. The junction between the capacitor C2 and resistor R2 is connected to the cathode of a diode D1, which has its anode connected to the anode of the series controlling thyristor SCR2. A further series circuit including resistors R3, R4, thyristor SCR4, diode D2 and resistor R18 is connected between the positive terminal of the main capacitor C1 and the gate of the thyristor SCR3. A resistor R5 is connected across the gate of the thyristor SCR3 an the bus E0. A parallel circuit of a resistor R6 and capacitor C4 is connected between the junction between the junction between the resistors R3, R4 and the bus E0 while another parallel circuit of a capacitor C5 and resistor R7 is connected between the gate of the thyristor SCR4 and the anode of the diode D2. A series circuit including a capacitor C6, resistor R8 and resistor R9 is connected between the positive terminal of the main capacitor C1 and the anode of the diode D2 while a series circuit including a capacitor C7 and resistor R10 is connected between the anode of the trigger thyristor SCR1 and the junction between the resistors R8, R9. The gate of the thyristor SCR4 is connected through a resistor R11 to the collector of the transistor Q7 which is of PNP type. The emitter of the transistor Q7 is connected to the bus E0 through the collector-emitter path of PNP transistor Q8, which forms a noise suppression circuit 15 of known form, together with resistors R12, R13 and capacitor C8. Series circuit including the emitter-collector path of an NPN transistor Q9, resistor R14, diode D3 and resistors R15, R16 is connected between the junction between the resistors R8, R9 and the bus E0. The base of the transistor Q9 is connected through a resistor R17 to the collector of the transistor Q12 which is contained in the illumination control circuit 14.

When the electronic flash units 2-4 are connected with the camera 1 as shown in FIG. 1, the flashlight interruption circuit 13 is connected to a signal transmitting terminal T0 which is adapted to receive an illumination control signal from the camera 1, and to an external control terminal S1 which is adapted to deliver an illumination interrupting, control signal to the subsidiary units 3, 4 from the main unit 2. Specifically, the signal transmitting terminal T0 is disposed on the mounting leg 2a of the main unit 2 which is adapted to be connected with the hot shoe 1a (see FIG. 1) of the camera 1, and the external signal terminal S1 is provided in a cord connection outlet 2b to which the multiple connector 5 is connected for connection of the subsidiary units 3, 4 with the main unit 2. The both terminals T0 and S1 are connected to the anode of the diode D3 which is included in the flashlight interruption circuit 13. A signal transmitting terminal X0 provided on the mounting leg 2a and which is adapted to be connected with the synchro contact of the camera 1 and an external signal terminal X1 provided in the outlet 2b are connected through a back flow preventing diode D4 to a portion of the flashlight emission circuit 12 which functions to fire the trigger thyristor SCR1. A signal transmitting terminal L0 which is provided on the mounting leg 2a for transmitting a display signal and an external signal terminal L1 provided in the outlet 2b are connected to the collector of a transistor Q4 which forms part of a display circuit disposed within the flashlight emission circuit 12. The mounting leg 2a itself serves as a ground terminal G0, and is connected to the bus E0 as is an external signal terminal G1 provided in the outlet 2b.

The illumination control circuit 14 includes an automatic/manual changeover switch SW2 having a movable contact W0 and five fixed contacts W1-W5, to which the movable contact W0 can be switched. When the movable contact W0 is thrown to the fixed contact W1, a diaphragm value of the camera is automatically established at a value of F8. When the movable contact W0 is thrown to the fixed contact W2, a diaphragm value of F5.6 is established while a diaphragm value of F4 is established when the movable contact W0 is thrown to the fixed contact W3. When the movable contact W0 engages one of the fixed contacts W1 to W3, an automatic flash photography is enabled under the illumination from the electronic flash. When the movable contact W0 is thrown to the fixed contact W4, a flash photography takes place under the flashlight illumination from the electronic flash units which correspond to one-quarter of the total flashlight illumination therefrom, which is referred to as a manual one-quarter illumination. When the movable contact W0 is thrown to the fixed contact W5, the total flashlight emission from the electronic flashlights is allowed to enable a flash photography, which is referred to as a manual full illumination.

In operation, the respective units 2-4 are connected with the camera 1 as shown in FIG. 1. The movable contact W0 of the changeover switch SW2 in the main unit 2 is thrown to one of the fixed contacts W1-W3 in which an automatic flash photography takes place. By way of example, an operation will be described which occurs when the movable contact W0 of the changeover switch SW2 of the main unit 2 is thrown to the fixed contact W3. The movable contact W0 of the changeover switches SW2 of the subsidiary units 3, 4 is thrown to the fixed contact W5 where the manual full illumination takes place. It is to be noted that the external control terminals L1, X1, G1 and S1 of the respective units 2-4 are interconnected through the multiple connector 5 shown in FIG. 1, and are also connected to the signal transmitting terminals L0, X0, G0 and T0, respectively, of the camera 1 through the hot shoe 1a and the main unit 2.

When the respective units 2-4 are connected to the camera 1 in this manner, the camera 1 and the main unit 2 are directed toward the object 6 while the subsidiary units 3, 4 are disposed in suitable orientations in consideration of the illumination effect. It is to be understood that an arrangement is made on the part of the camera so that the illumination control circuit 14 operates alone without cooperating with an exposure control circuit of the camera 1. In response to a shutter release of the camera 1, the individual flash units 2, 3 and 4 are simultaneously activated for illumination in synchronism with a shutter opening. Reflected light from the object 6 which is thus illuminated by the flashlight impinges on the phototransistor P of the illumination control circuit 14 of the main unit 2. The phototransistor P becomes conductive in accordance with the amount of light incident thereon to produce a photocurrent, which charges the integrating capacitor C3. When the voltage across the integrating capacitor C3 reaches a given threshold level of a transistor Q12, the latter is rendered conductive and in turn renders the transistor Q9 conductive. The conduction of the transistor Q9 lowers the base potential of the transistor Q7, which therefore conducts. Simultaneously, a signal through the conductive transistor Q9 is transmitted through the diode D3 and a line H to the external control terminal S1 and the signal transmitting terminal T0 which is disposed on the hot shoe 1a of the camera 1. The signal transmitted to the terminal T0 is then fed to an electrical circuit within the camera 1, but remains without effect whatsoever. The signal transmitted to the external control terminal S1 is fed through the multiple connector 5 to the subsidiary units 3, 4 where it is supplied to the anode of the diode D3 of the respective flashlight interruption circuit 13 of the subsidiary units 3, 4. This signal is then effective to render the transistor Q7 of the respective units conductive in the same manner as it did in the main unit 2. When the transistors Q7 in the main unit 2 and the subsidiary units 3, 4 are rendered conductive, the respective flashlight interruption circuits 13 operate in a similar manner to terminate the emission of flashlight from the respective electronic flash units. Specifically, in each of the flash units 2 to 4, the conduction of the transistor Q7 fires the thyristor SCR4 to render it conductive. When the thyristor SCR4 conducts, there is permitted a current flow through a path including capacitor C4, resistor R4, thyristor SCR4, diode D2, and resistors R18, R15, whereby the gate potential of the thyristor SCR3 increases to fire it for conduction. The conduction of the thyristor SCR3 diverts the current, which has been flowing through the thyristor SCR2, to the commutating capacitor C2 which is charged to the polarity shown, whereby the current flow through the thyristor SCR2 is reduced below its holding level, thus turning the thyristor SCR2 off. Consequently, the flash discharge tubes F in the respective flash units 2 to 4 terminate the emission of their flashlight concurrently.

As discussed above, with the multiple bulb controlling electronic flash assembly of the invention, the main flash unit determines the amount of illumination which has been given and controls the timing of terminating the emission of flashlight from its own and other subsidieary flash units, thus providing a proper amount of illumination from the entire flash unit assembly.

What is claimed is:

1. Apparatus for controlling multiple electronic flash units, comprising:
   a main electronic flash unit and at least one secondary electronic flash unit;
   each of said electronic flash units including: a flashlight emission circuit for emitting flashlight from a flash discharge tube; a flash illumination control circuit for determining reflected light from a subject being photographed which is illuminated by the flashlight from the flash discharge tube of each of said electronic flash units and for producing a flash interrupting, control signal; a changeover switch for disabling said flash illumination control circuit; a flashlight interruption circuit for interrupting the emission of the flashlight from each of said flash discharge tubes in response to receipt of said flash interrupting, control signal from said flash illumination control circuit; and an external connection terminal connected to a junction between said flash illumination control circuit and said flashlight interruption circuit for receiving and delivering said flash interrupting, control signal;
   said main electronic flash unit being adapted to be electrically connected to said at least one secondary electronic flash unit via said respective external connection terminals through which said flashlight interruption circuit of said at least one secondary electronic flash unit is connected to said flashlight interruption circuit of said main electronic flash unit in parallel; and
   said flashlight interruption circuits of said main and secondary electronic flash units being responsive to receipt of said flash interrupting, control signal from said flash illumination control circuit of said main electronic flash unit to interrupt the emission of flashlight from each of said flash discharge tubes by operating said changeover switch to thereby disable said flash illumination control circuit of said at least one secondary electronic flash unit.

2. A combination of a photographic camera and a plurality of electronic flash units in which each of the electronic flash units comprises:
   a flashlight emission circuit for the emission of flashlight from the flash discharge tube;
   an illumination control circuit for determining an amount of illumination given in response to reflected light from an object being photographed which is illuminated by the flashlight from the flash discharge tube and for producing a flashlight interrupting, control signal;
   a flashlight interruption circuit for interrupting the emission of the flashlight from the flash discharge tube in response to the flashlight interrupting, control signal from the illumination control circuit;
   an external connection terminal connected to the flashlight interruption circuit for receiving and delivering a flashlight interrupting, control signal from the illumination control circuit and connected to one or more of said plurality of electronic flash units to control same or for receiving and delivering a flashlight interrupting, control signal from one of said plurality of electronic flash units to interrupt the emission of flashlight from the flash discharge tube by supplying the signal to the flashlight interruption circuit;
   and an automatic/manual changeover switch for permitting a selection between an automatic determination of reflected light from the object or the failure of such automatic determination;
   and in which the external connection terminals of the plurality of electronic flash units are connected with each other so that the changeover switch of one of the plurality of the electronic flash units which acts as a main unit is thrown to a position where an automatic determination is effected while the changeover switches of the remaining electronic flash units are thrown to a manual position where the automatic determination is not made, thus permitting a flash photography under the illumination from the plurality of electronic flash units.

3. A combination according to claim 2 in which the external connection terminals of the plurality of electronic flash units are interconnected through a multiple connector.

* * * * *